United States Patent [19]

Moritani et al.

[11] Patent Number: 4,999,229

[45] Date of Patent: Mar. 12, 1991

[54] MULTILAYERED PACKAGING MATERIALS HAVING HIGH GAS BARRIER PROPERTY

[75] Inventors: Tohei Moritani; Susumu Fukutome; Yasuo Motoishi; Hidemasa Oda, all of Kurashiki, Japan

[73] Assignee: Kuraray Co., Ltd., Kurashiki, Japan

[21] Appl. No.: 291,732

[22] Filed: Dec. 29, 1988

[30] Foreign Application Priority Data

Dec. 29, 1987 [JP] Japan .............................. 62-335823
Feb. 1, 1988 [JP] Japan .............................. 63-22580

[51] Int. Cl.$^5$ .............................................. B29D 22/00
[52] U.S. Cl. ................................. 428/36.6; 428/36.7; 428/412; 428/476.3; 428/480; 428/483
[58] Field of Search ................. 428/36.6, 412, 480, 428/483, 474.4, 476.3, 36.7

[56] References Cited

U.S. PATENT DOCUMENTS

| | | | |
|---|---|---|---|
| 4,407,897 | 10/1983 | Farrell et al. | 428/516 |
| 4,425,410 | 1/1984 | Farrell et al. | 428/516 |
| 4,451,512 | 5/1984 | Yazaki | 428/516 |
| 4,501,798 | 2/1985 | Koschak | 428/516 |
| 4,559,266 | 12/1985 | Misasa et al. | 428/341 |
| 4,576,988 | 3/1986 | Tanaka et al. | 524/503 |
| 4,608,286 | 8/1986 | Motoishi et al. | 524/503 |
| 4,610,914 | 9/1986 | Newsone | 428/36.7 |
| 4,613,644 | 9/1986 | Moritani et al. | 428/215 |
| 4,619,849 | 10/1986 | Anzawa et al. | |
| 4,636,551 | 1/1987 | Okaya et al. | 525/60 |
| 4,640,870 | 2/1987 | Akazawa et al. | 524/430 |
| 4,645,695 | 2/1987 | Negi et al. | 428/35 |
| 4,724,185 | 2/1988 | Shah | 428/36.7 |
| 4,769,261 | 9/1988 | Hazelton et al. | 428/516 |
| 4,883,696 | 11/1989 | Iwanami et al. | 428/36.6 |

FOREIGN PATENT DOCUMENTS

| | | |
|---|---|---|
| 50-86579 | 7/1975 | Japan . |
| 54-78749 | 6/1979 | Japan . |
| 1545096 | 5/1979 | United Kingdom . |
| 2006108 | 5/1979 | United Kingdom . |

Primary Examiner—Edith Buffalow
Attorney, Agent, or Firm—Kramer, Brufsky & Cifelli

[57] ABSTRACT

This invention provides a gas-barrier multilayered packaging material which comprises an outer layer of a composition comprising 55–97 wt % of an EVOH and 45–3 wt % of a resin selected from the group consisting of polyamide, polyolefin, polyester and polycarbonate and an inner layer comprising a hydrophobic thermoplastic resin having a low moisture permeability; and further provides a gas-barrier multilayered packaging material with comprises an outer layer comprising a resin layer having a moisture permeability (measured at 40° C., 90% RH) of at least 40 g/m$^2$ day, an intermediate layer of a composition comprising 55 to 97% by weight of an EVOH and 45 to 3% by weight of a resin selected from the group consisting of polyamide, polyolefin, polyester and polycarbonate and an inner layer comprising a hydrophobic thermoplastic resin layer having a moisture permeability lower than that of the outer layer. Both of them are useful as packaging materials to be used for boil sterilization or retort sterilization.

21 Claims, No Drawings

MULTILAYERED PACKAGING MATERIALS HAVING HIGH GAS BARRIER PROPERTY

BACKGROUND OF THE INVENTION

1. Field of the Invention

This invention relates to multilayered packaging materials being excellent in food keeping performances due to their high gas barrier properties, particularly to multilayered packaging films, in particular lids to be used for retorting or pauches to be used for retorting, which are unparalleled with respect to excellent transparency together with high gas barrier properties. This invention also includes cup-shape or tray-shape containers to be used for retorting having high gas barrier properties.

2. Description of the prior art

Laminate films consisting of aluminum foil and polyolefin, particularly polypropylene, and metal lids for double-seaming are used as lids to be used for retorting. Both of them have nearly perfect gas barrier properties, while they have a drawback of not being transparent, thereby rendering the contents invisible. The contents should necessarily be seen from outside in view of appeal to consumers, as well as of the requirement for the contents not to be spilled when the container is opened, or of convenience when the lid is locally pierced with a hole before the container is heated in the micrwave or the like. However, transparent lids made of plastic film are currently only in use for limited uses due to their insufficient gas barrier properties, particularly insufficient oxygen gas barrier properties. Polyvinylidene chloride polymer (principally vinylidene chloride-vinyl chloride copolymers, hereinafter sometimes referred to as PVDC) is a representative example of gas-barrier resins currently in use for lids, and is used in a form of laminated film obtained by laminating thereon a biaxially oriented nylon film (hereinafter sometimes referred to as ON) for the outer layer and a polypropylene film (hereinafter sometimes referred to as PP) for the inner layer which is a sealing layer by dry laminating or the like process. The oxygen gas transmission rate or oxygen permeability (hereinafter abbreviated as OTR) of PVDC is 3 to 20 cc/$m^2$·day·atm per 20 $\mu$. Since an OTR of about 0.8 cc/$m^2$·day·atm is required for a packaging material to keep food therein in a good condition for 6 months under normal circumstances, PVDC must have a thickness of at least 75 $\mu$. Then, if PVDC film is 75 $\mu$ thick, it will have a high haze and become yellowish. The film thickness of PVDC therefore is generally 15 to 30 $\mu$, and about 50 $\mu$ only for some uses where a high barrier property is particularly required. Thus, PVDC lids cannot be said to have sufficient food keeping performances.

Recently, films made of vinylidene chloride-ethyl acrylate copolymers are known to have particularly high gas barrier properties among PVDC-related polymers. The OTR is 1.2 cc·20 $\mu$/$m^2$·day·atm. The polymer, however, has drawbacks of becoming and increasing its OTR by retort treatment, thereby being unuseable as a transparent lid for retorting.

Among gas-barrier resins other than PVDC, there are metaxylylenediamine-adipic acid condensate (MX-nylon), polyamide, PVDC-coated polyamide and the like being used for lids. They are all of low oxygen gas barrier properties, and hence are used only for such limited kinds of foods as have low oxidation-degradation liability or are transported and stored at low temperatures.

Pauches among packaging films for retorting are under still severer conditions. That is, while a lid is only a part of a container, transparent packaging films used for pauches, skinpacks, deep-drawn packages, rocket packaging and the like constitute the whole container. Since any transparent packaging films used currently for the above packagings are not of sufficient gas barrier properties, the packages after retort treatment are all transported and stored only at low temperatures.

Ethylene-vinyl alcohol copolymer resin (hereinafter sometimes referred to as EVOH) is a thermoplastic resin having the highest gas barrier properties of today and ones exhibiting OTR's of from 0.3 (at 60% RH) to 0.75 (80% RH) cc·20 $\mu m^2$·day·atm are used as general-purpose brands (EVAL®Type F, made by Kuraray Co.). EVOH is widely used as a gas-barrier material for retortable containers such as cups and trays, for which employed are multilayered structures comprising EVOH for the intermediate layer and PP which has low moisture permeability as the inner and outer layers. For the purpose of further increasing food keeping performance, there is a method which comprises incorporating a drying agent in an adhesive resin layer between PP layer and EVOH layer (U.S. Pat. No. 4,407,897) or a method which comprises incorporating a drying agent in EVOH layer itself (U.S. Pat. No. 4,425,410).

Further, Japanese Patent Publication No. 24254/1986 (B.P. 2,006,108) discloses a plastic bottle for containing food, consisting of an outer layer of a polyamide, an intermediate layer of a gas-barrier resin (e.g. EVOH) and an inner layer of a polyolefin or thermoplastic polyester; and also describes that as the gas-barrier resin a blend of EVOH with 6/66 copolymer nylon in a blending ratio of 50:50 by weight. However, it has been found that if the blend of EVOH containing polyamide (nylon) in as much as 50 wt % is used, there will occur problems of not only a decrease in gas barrier property but also whitening when stored after retort treatment of the multilayered package. This fact is apparent from Comparative Example 6 later described herein.

Japanese Patent Publication No. 38103/1954 (B.P. 1,545,096) describes a container comprising inner and outer layers of a moisture-resistant resin or creep-resistant resin having a low moisture permeability and an intermediate layer of a composition incorporating blended therein a gas-barrier resin (e.g. EVOH/polyamide in a ratio of from 90:10 to 10:90), but it does not describe about providing an outer layer of a resin having a comparatively high moisture permeability and an inner layer of another resin having a low moisture permeability, or further about using for the intermediate layer therefor a layer comprising EVOH blended with a relatively small amount of a polyamide. This patent does not describe either about a packaging material comprising an outer layer of the blended gas-barrier resin composition and an inner layer of a resin having a low moisture permeability, or about the use of such packaging material for packaging materials for retort sterilization or boil sterilization.

Japanese Patent Laid Open No. 54-78749 describes a blend of EVOH and polyamide and said blend being laminatable with other thermoplastic resin, but it does not describe a package material comprising an outer layer of said blend and an inner layer of a resin having a low moisture permeability.

SUMMARY OF THE INVENTION

While EVOH can give superior retortable containers when used sandwiched between inner and outer layers of thick PP layers, that is, when used for rigid containers such as cups and trays, it cannot give flexible packaging films such as lids and pauches which are retortable. Such packaging film must be flexible, which fact requires the inner and outer resin layers to be thin. Then, in the course of retorting, a large amount of moisture would invade into the EVOH layer, thereby markedly decreasing the gas barrier property. The invasion of moisture would also create a serious problem of whitening of the EVOH layer or generation of wavy wrinkles or patterns, which make unusable the film as a gas-barrier packaging film because of its poor appearance. Further, since EVOH melts at retorting temperatures (about 120° C.), it has never been attempted to provide EVOH or blends thereof at the outer layer of package which must contact hot water.

The present inventors assumed that the mechanism of the decrease in gas barrier property, whitening and generation of wavy wrinkle patterns through retorting is greatly influenced by, in addition to the moisture absorption of EVOH layer, the condition of water in the EVOH layer just after the retorting and the behavior of water passing from the EVOH layer through the outer layer outward and hence decreasing its amount in the film. Based on the assumption above, an extensive study was made on the influence of various compositions incorporating EVOH and resins of inner and outer layers.

As the result of the study, the inventors have found a surprising fact that should upset conventional concepts about EVOH, and have completed the first embodiment of the present invention. The fact is:

There can be obtained a packaging film which does not suffer a flow of EVOH of the outer layer leading to whitening or bad appearance including wavy wrinkles and patterns, and which still keeps a high gas barrier property inherent to EVOH, thereby exhibiting superior performances when used for lids and pauches; by providing as an outer layer, instead of EVOH, a composition comprising of 55-97% by weight of EVOH and 3-45% by weight of a resin selected from the group consisting of polyamide resin (hereinafter sometimes referred to as PA), polyolefin resin, polyester resin and polycarbonate resin and as an inner layer a hydrophobic thermoplastic resin such as PP having a low moisture permeability.

Though resins such as PA as an improving agent in the composition of the outer layer are distributed in the form of islands in EVOH layer, they greatly influence protection of the matrix of EVOH component from flowing. This fact is completely different from the accepted concept and anticipation at the start of the study. The outer layer and inner layer herein mean the outermost layer and the innermost layer respectively.

The present inventors have further studied and found another surprising fact and have completed the second embodiment of the invention. The fact is:

There can be obtained a packaging film usable in a variety of packaging fields, which does not create any whitening or bad appearance including wavy wrinkles and patterns, which still keeps a high gas barrier property inherent to EVOH, and which does not cause blocking with the same film adjacent thereto, thereby exhibiting superior performances when used for lids and pauches, by providing as an intermediate layer, instead of EVOH, a composition comprising 55-97% by weight of EVOH and 3-45% by weight of a resin selected from the group consisting of PA, polyolefin, polyester and polycarbonate, an outer layer having a moisture permeability (40° C., 90% RH) of at least 40 $g/m^2.day$, e.g. a layer containing as a principal component at least one resin selected from the group consisting of PA, polyester and polycarbonate, in particular a layer of PA having such moisture permeability, and an inner layer of a thermoplastic resin, in particular PP or the like having a moisture permeability lower than that of the outer layer.

Means and/or facts adopted finally in the invention are completely different from general recognition or anticipation conceived at the start of the study; the facts are:

Though PA or like resins as an improving agent in the composition of the intermediate layer is distributed in the form of islands in EVOH layer, it greatly influences the behavior of the matrix EVOH at retorting; and while conventional methods for producing packaging materials for retorting comprises employing as resins sandwiching EVOH layer ones having moisture permeabilities as low as possible, here, conversely, it is effective to provide as the outer layer a resin having a high moisture permeability.

DETAILED DESCRIPTION OF PREFERRED EMBODIMENT

Ethylene-vinyl alcohol copolymer (EVOH) is one of the resins constituting the composition of the outer layer of the first embodiment and the intermediate layer of the second embodiment and may include any polymer as long as it is obtained by hydrolyzing vinyl acetate component of a copolymer of ethylene and vinyl acetate. As EVOH is particularly suited for the purpose of the present invention, mentions are made of those having an ethylene content of 20 to 50 mol %, particularly 27 to 40 mol %, a saponification degree of vinyl acetate component of at least 96%, preferably at least 99%, and a melt index (190° C., 2160g) of 0.2 to 60 g/10 min. The EVOH in the present invention may be one modified with not more than 5 mol % of a copolymerizable monomer. Examples of such modifying monomer include, among others, propylene, 1-butene, 1-hexene, 4-methyl-1-pentene, acrylic acid esters, methacrylic acid esters, maleic acid, fumaric acid, itaconic acid, higher fatty acid vinyl esters, alkylvinyl ethers, N-(2-dimethylaminoethyl)-methacrylamide or its quaternary compound, N-vinylimidazole or its quaternary compound, N-vinylpyrrolidone, N, N-butoxymethylacrylamide, vinyltrimethoxysilane, vinylmethyldimethoxysilane and vinyldimethylmethoxysilane.

Examples of polyamide resins (PA) as one of counterpart resins constituting the composition of the outer layer of the first embodiment or the intermediate layer of the second embodiment include, among others, polycaprolactam (nylon-6), poly-ω-aminoheptanoic acid (nylon-7), poly-ω-aminononanaoic acid (nylon-9), polyundecaneamide (nylon-11), polylauryl lactam (nylon-12), polyethylenediamine adipamide (nylon-2, 6), polytetramethylene adipamide (nylon-4, 6), polyhexamethylene adipamide (nylon-6, 6), polyhexamethylene sebacamide (nylon-6,10), polyhexamethylene dodecamide (nylon-6, 12), polyoctamethylene adipamide (nylon-8, 6), polydecamethylene adipamide (nylon 10, 6)

and polydodecamethylene sebacamide (nylon-10, 8); or caprolactam/lauryl lactam copolymers (nylon 6/12), caprolactam/ω-aminononanic acid copolymers (nylon-6/9), caprolactam/hexamethylene diammonium adipate copolymers (nylon-6/6, 6), lauryl lactam/hexamethylene diammonium adipate copolymers (nylon-12/6, 6), hexamethylene diammonium adipate/hexamethylene diammonium sebacate copolymers (nylon-6, 6/6, 10), ethylene diammonium adipate/hexamethylene diammonium adipate copolymers (nylon-2, 6/6, 6), caprolactam/hexamethylene diammonium adipate/hexamethylene diammonium sebacate copolymers (nylon-6/6, 6/6, 10), polyhexamethylene isophthalamide, polyhexamethylene terephthalamide and hexamethylene isophthalamide/terephthalamide copolymer.

Among the above mentioned PA's, caprolactam/lauryl lactam copolymer, that is, nylon-6/12 is the most preferred in the present invention. While there are no particular limits to the composition of 6-component and 12-component in nylon-6/12, a 12-component of 5 to 60 wt %, particularly 10 to 50 wt % is preferred. The relative viscosity is 2.0 to 3.6, preferably 2 to 3.2.

These PA's, particularly nylon-6/12, may be modified to polyamides containing in their polymer chain ether bonds by addition of polyetherdiamine and dicarboxylic acid (dimeric acid or the like) in the course of polycondensation reaction. Also preferred are those polyamides in which the number of carboxyl end groups is reduced by addition, at the polycondensation, of an aliphatic amine such as hexamethylenediamine or laurylamine or an aromatic amine such as metaxylylenediamine or methylbenzylamine. In this case, polyamides having at least $8 \times 10^{-5}$ eq./g of amino end groups and not more than $3 \times 10^{-5}$ eq./g of carboxyl end groups are preferred.

It is quite unexpected that though PA in a composition distributes mostly as island component in EVOH layer, it still has a great effect of suppressing the sensitivity of EVOH against water, particularly of preventing whitening and generation of wavy patterns or stripe patterns. The mechanism producing such marked effect is not well clarified. While PA is the best improving agent to be incorporated in EVOH, other resins including polyolefin, polyester and polycarbonate can also be used for the same purpose. It is believed, however, considering the fact that some degree of effect is also produced by blending, instead of PA, such resins as polyolefin, polyester, polycarbonate and the like with EVOH on preventing generation of wavy patterns or stripe patterns after retorting at 120° C., such effect can be produced by the blending of a resin having a melting point higher than the retorting temperature. For a retort sterilization at a lower temperature (e.g. 105° to 115° C.) or for the purpose of boiling sterilization, blending of medium density polyethylene or low density polyethylene also has an effect to some extent. However, a blend of PP, PP modified with maleic anhydride, polyethylene or polyester with EVOH has a drawback of causing poor transparency as compared with the case of the blend of PA with EVOH. For packaging films such as lids which end-uses emphasize transparency, blending PA with EVOH is preferred. For cups, trays and the like which does not require transparency, blending the above-mentioned resins such as PP with EVOH can be employed.

Examples of polyolefin resins used in this invention include, among others, high density, medium density or low density polyethylene; copolymers of polyethylene with vinyl acetate, acrylic acid esters, or a-olefins such as butene, hexene, 4-methyl-1-pentene; ionomers; polypropylene homopolymer; polypropylene grafted with ethylene; copolymers of propylene with a-olefins such as ethylene, hexene, 4-methyl-1-pentene and the like; poly-1-butene, poly-4-methyl-1-pentene and the like. Modified polyolefins, particularly modified polypropylene, are also used preferably because of their improved compatibility with EVOH. Examples of modifying agents used here are maleic acid, acrylic acid, methacrylic acid, crotonic acid, fumaric acid, itaconic acid, maleic anhydride, itaconic anhydride, citraconic anhydride, ethyl acrylate, methyl methacrylate, ethyl maleate, acrylic acid-2-ethylhexyl, acrylamide, methacylamide, coconut oil fatty acid amides, maleimide, and the like. Such agents modify the above-mentioned polyolefins to incorporate carbonyl group therein in concentrations of 10 to 1400 millimoles/100g of polymer, preferably 30 to 1200 millimoles/100g of polymer.

Examples of polyester resins (saturated polyester resins) include, among others, poly(ethylene terephthalate), poly(butylene terephthalate), poly(ethyleneterephthalate/ isophthalate), poly(ethylene glycol/cyclohexanedimethanol/ terephthalate), and the like. Further, the above polyesters can also be used as copolymerized with diols such monomers as ethylene glycol, butylene glycol, cyclohexanedimethanol, neopentylglycol, pentanediol, etc. and dicarboxylic acids such as isophthalic acid, benzophenonedicarboxylic acid, diphenylsulfonedicarboxylic acid, diphenylmethanedicarboxylic acid, propylenebis(phenylcarboxylic acid), diphenyloxidedicarboxylic acid, oxalic acid, malonic acid, succinic acid, glutaric acid, adipic acid, pimelic acid, suberic acid, azelaic acid, sebacic acid, diethylsuccinic acid, etc.

The composition ratio of EVOH and a counterpart resin selected from PA, polyolefin, polyester and polycarbonate which constitute the outer layer of the first embodiment or the intermediate layer of the second embodiment is 55-97 wt %: 45-3 wt %, preferably 65-85 wt %: 15-35 wt %. If the counterpart component is too small, the obtained multilayered packaging material tends to produce, upon retorting, defects in its appearance such as wavy wrinkles and patterns. On the other hand, if the counterpart component is too large, not only the gas barrier property will decrease but a white shade tends to remain on the multilayered packaging material stored after retort sterilization, both of which are not preferred.

The composition of the outer layer of the first embodiment and the intermediate layer of the second embodiment may incorporate, within limits not to impair the purpose of the present invention, other polymers or additives such as antioxidants, ultraviolet absorbers, plasticizers, antistatic agents, lubricants, colorants and fillers. Examples of the other polymers include polystyrene, polyvinyl chloride, acrylics, polyvinylidene chloride, polyurethanes, and the like. Among the above, copolymers of an ethylenically unsaturated momomer (e.g. olefins such as ethylene and propylene) containing 2 to 25 mol % of at least one component selected from vinyl acetate, acrylic acid esters and methacrylic acid esters or its saponified product can give, upon blending with EVOH, a flexibility to the obtained multilayered structure. Examples of the additives other than the polymers are as follows: Stabilizers: calcium acetate, calcium stearate, hydrotalcites, metal salts of ethylenediaminetetraacetic acid and the like. Antioxidants: 2,5-di-t-butylhydroquinone, 2,6-di-t-butyl-cresol, 4,4'-thiobis-(6-t-butylphenol), 2,2'-methylene-bis(4-methyl-6-t-butylphenol), octadecyl-3-(3',5'-di-t-butyl-4'-hydroxyphenyl)propionate, 4,4'-thiobis-(6-t-butyl-phenol) and the like.

Ultraviolet absorbers: ethyl-2-cyano-3,3-diphenylacrylate, 2-(2'-hydroxy-5'-methylphenyl) benzotriazol, 2-(2'-hydroxy-3'-t-butyl-5'-methylphenyl)-5-chlorobenzotriazol, 2-hydroxy-4-methoxybenzophenone, 2,2'-dihydroxy-4-methoxybenzophenone, 2-hydroxy-4-octoxybenzophenone and the like.

Plasticizers,: dimethyl phthalate, diethyl phthalate, dioctyl phthalate, wax, liquid paraffin, phosphoric acid esters and the like.

Antistatic agents: pentaerythrit monostearate, sorbitan monopalmitate, oleic acid sulphate, polyethylene oxide, carbo wax and the like.

Lubricants: ethylenebisstearoamide, butyl stearate and the like. Colorants: carbon black, phthalocyanine, quinacridone, indoline, azo-dyes, titanium oxide, Indian red and the like. Fillers: glass fiber, asbestos, mica, ballastonite, sericite, talc, glass flake, calcium silicate, aluminum silicate, calcium carbonate and the like.

Particularly, powder selected from mica, sericite, talc and glass flake in an amount of 5 to 60 wt % blended with 95 to 40 wt % of the above blended resin composition is preferably used for the outermost layer or the intermediate layer, particularly for the outermost layer, since it will increase the gas barrier property. This modification is principally applicable to containers such as cups and trays.

As the blending method to obtain the compositions of the present invention a method is employed which comprises meltextruding through a monoaxial or biaxial screw extruder (same direction or different directions), an intensive mixer, a continuous intensive mixer or the like, and thereafter pelletizing the extruded blend under cooling.

In the multilayered packaging material of the present invention, the above composition comprising EVOH and a resin selected from the group consisting of PA, polyolefin, polyester and polycarbonate bears a role of a barrier material, the thickness of which directly affects the barrier performance. The thickness of the composition layer is selected from a range of from 5 to 250 $\mu$, generally from 8 to 100 $\mu$.

Hereinbelow, resins to be used for the outer layer of the multilayered packaging material of the second embodiment will be described. Whereas the packaging material of the first embodiment sometimes causes blocking with the neighboring same material when being retorted, the packaging material of the second embodiment is free from such problem and hence is particularly usable in practice. Since the moisture permeability of the outer layer influences the appearance and the gas barrier property after retorting of the multilayered packaging material of the invention, in particular those having an outer film layer, the resin used therefor must be selected carefully. While in the case where the multilayered packaging material is subjected to a sterilization treatment at 100° C. or below, i.e. so-called boiling sterilization, a resin having not so high thermal resistance may be used; for treatments at temperatures exceeding 100° C., particularly for retort sterilization conducted at a temperature of from 105 to 135° C., thermal resistance should also be taken into consideration. It has been found that in the second embodiment the better result is obtained in terms of appearance and gas barrier property after retorting, and so forth, the higher the moisture permeability of the outer layer. For evaluating moisture permeability, it is convenient to employ a method shown in JIS-Z-0208, which comprises mounting a specimen film onto a cup containing a moisture absorbent, and fixing it to seal tight the cup, and thereafter allowing the cup to stand in a constant-temperature-and-moisture oven conditioned at 40° C. and 90% RH, followed by measurement of the rate of weight increase. The moisture permeability of an outer layer measured according to this method is preferably at least 40 g/m$^2$.day, more preferably at least 100 g/m$^2$.day, most preferably at least 200 g/m$^2$.day. If the moisture permeability is less than 40 g/m$^2$.day, the gas barrier property will restore only slowly during storage after retort sterilization.

In the present invention resins used preferably for the outer layer of the second embodiment are polyamides, polyesters and polycarbonates, among which PA is most preferred. As examples of the PA mentions are made of afore-described various PA's used for the outer layer of the first invention or for the intermediate layer of the second invention, among which preferred are nylon-6, nylon-6,6, nylon-6/6,6, and the like. The moisture permeabilities of the resins per thickness of 10 $\mu$ are from 900 to 1100 g/m$^2$ day for unoriented polymers and about 390 g/m$^2$.day for biaxially oriented polymers. The thickness therefore is 275 $\mu$ or below, preferably 110 $\mu$ or below, most preferably from 15 to 40 $\mu$ for unoriented nylons. Biaxially oriented nylons are used with a thickness of 97 $\mu$ or below, preferably 39 $\mu$ or below, most preferably from 10 to 20 $\mu$. Polycarbonates, which have moisture permeabilities of from 120 to 150 g/m$^2$.day per 10 $\mu$, can also be used for the outer layer and are used preferably in a thickness of from 10 to 38 $\mu$.

Polyester resins can also be used for the outer layer of the second embodiment. In particular, drawn films of polyethylene terephthalate resin having a moisture permeability of 60 g/m$^2$.day, are used in a thickness of not more than 15 $\mu$.

Other resins usable for the outer layer in the second embodiment and their moisture permeabilities (in parentheses) are: polyetherether ketones (143), polysulfones (490), polyethersulfones (500), polyetherimides (218), polyimide (208) and polyarylate (510). On the other hand, polyvinyl chloride and polystyrene are, though having high moisture permeabilities which are suited for the multilayered packaging material of the present invention, low in thermal resistance, thereby being usable only for such limited uses as are subjected to a low-temperature sterilization. Polypropylene has a low moisture permeability (14 to 35 g/m$^2$·day per 10 $\mu$) and can hence generally hardly be used for this purpose. Polyethylene is also low in moisture permeability and in thermal resistance, thereby being not suited for the invention.

The moisture permeability of a resin used for the outer layer is determined depending on the type of the laminate as follows: When an outer layer can be peeled off as a single-layer film, to measure its moisture permeability, from a laminate obtained by dry lamination, then the permeability thus measured will work as that of the outer layer. Adhesives in a laminate obtained by dry lamination have little effect on moisture permeability and are hence not taken into consideration. For a multi-layered structure already laminated (a laminate or a coextruded film), the moisture permeability of a single-layer film made of the resin constituting the outer layer can be used as that of the outer layer of the structure. In the case where the outer layer consists of two or more layers, the moisture permeability of the entire outer layer consisting of such number of layers can be obtained by the usual method from the moisture permeabilities of the single-layer films each made of the respective resins constituting the layers. This handling of moisture permeability can also apply in the case of the inner layer described next.

It is important that a hydrophobic thermoplastic resin layer having a low moisture permeability be used for the inner layer of the multilayered structure of the first and second embodiments. In particular, in the second embodiment it is important that the moisture permeability of the inner layer be lower than that of the outer layer. And, depending on the purpose, further superior packaging materials can be obtained by properly selecting resins to be used for the inner layer in terms of moisture permeability, thermal resistance, heat sealability, transparency and the like.

First of all, the lower the moisture permeability of the inner layer, the higher the gas barrier property of the obtained multilayered structure will generally be. This is believed to be attributable to the fact that the relative humidity of the intermediate layer becomes lower, as the moisture permeability of the inner layer is lower. The moisture permeability as defined hereinbefore of the inner layer is preferably not more than 20 g/mz$^2$·day, more preferably not more than 10 g/m$^2$·day. For example polypropylene of 50 $\mu$ thickness (moisture permeability 7 g/m$^2$·day) will give a preferred result. Polypropylene is also satisfactory from the viewpoints of thermal resistance, heat sealability and transparency. While polypropylene is thus suitable for the inner layer for many end-uses, other thermoplastic resins may also be used. Examples of such resins are polyolefins other than polypropylene, polyamides, polyesters, polystyrene, polyvinyl chloride, acrylics, polyvinylidene chloride, polyacetals, polycarbonates and the like. These resins are used singly or in a laminate of more than two. In the second embodiment, the moisture permeability of the inner layer can be made lower than that of the outer layer by either selecting a resin suited therefor or by adjusting thickness ratio, etc. of the inner layer to the outer layer.

Before-mentioned additives such as antioxidants, colorants and fillers may also be incorporated in the resins used for the inner layer of the first and second embodiments and for the outer layer of the second embodiment.

The multilayered packaging materials of the first and the second embodiments can be produced by the following various laminating processes: co-extrusion with or without an interlayer adhesive resin, dry lamination, sandwich lamination, extrusion lamination, co-extrusion lamination and the like. As the adhesive resin, there is used a resin comprising a polyolefin such as polypropylene, polyethylene, a copolymer of ethylene with a monomer copolymerizable therewith (vinyl acetate, acrylic acid ester or the like), or the like, modified by addition of maleic anhydride or the like.

Next, lamination process particularly employed in the second embodiment is explained. In the co-extrusion process, when PA is used for the outer layer, sometimes an adhesive resin layer is not required between the intermediate layer, which fact is advantageous from the viewpoint of operatability. In the case where an adhesive resin layer is provided, it is preferred that the total moisture permeability of the outer layer and the adhesive resin layer be as high as possible, particularly at least 40 g/m$^2$·day. For dry lamination, generally employed is a process which comprises bonding, with an adhesive, three or more layers of films of the outer layer, the intermediate layer and the inner layer. Commercial films can be used for the outer layer. Examples of preferred films include unoriented nylon films (CN) and biaxially oriented nylon films (ON), monoaxially oriented polyethylene terephthalate film (PET), polycarbonate films and the like. Among them, biaxially oriented films, particularly biaxially oriented nylon films can enhance the effect of the invention, and are hence most preferred. For the inner layer, used preferably besides nylon films (CN or ON) are unoriented polypropylene film (CCP), biaxially oriented polypropylene film (OPP), polyethylene film, polyvinylidene film and the like, among which unoriented polypropylene film is most preferably used for the inner layer in the case where retortability and heat sealability are important. A good result can also be obtained by a method which comprises laminating the intermediate layer and the inner layer by co-extrusion, and then laminating thereon by dry lamination ON, CN or the like films.

The multilayered packaging materials of the first and the second embodiments exhibit their performance best when used as a packaging film, particularly one to be used for boil sterilization or retort sterilization. As uses for packaging films, mentions are made of lids, pauches, vacuum packages, skin packs, deep-drawn packages, rocket packages and the like. A lid is best used by a method which comprises tight sealing with it by heat-sealing a container comprising principally polypropylene laminated thereon with a gas-barrier material. The lids of the present invention have a high food-keeping performance and high transparency with no yellowish shade, thereby enhancing the commercial value of the container, and further have an advantage in that it can be opened while the contents are being watched. Pauches are used in various forms such as 3-side sealing, 4-side sealing, pillows, gazettes and standing pauches, and can also be used as "bag-in-box". The multilayered packaging materials of the first and the second embodiments also exhibit superior performances when used as, besides packaging films, cup-shape or tray-shape containers. In this case polypropylene, high-density polyethylene, heat-resistant polyesters or the like is used for the inner layer, in a thickness of from 200 to 1200 $\mu$, which is larger than in the case of packaging films. For forming such containers, employed are such methods such as one which comprises co-extrusion laminating the outer layer nylon and the intermediate layer composition onto a thicker sheet of the inner layer resin, and one which comprises laminating a laminate of nylon film and the composition film (obtained by dry lamination or co-extrusion) onto a sheet of the inner layer resin by dry lamination, sandwich-laminating or the like, followed by deep drawing using a vacuum air-pressure thermoforming machine.

Containers utilizing the multilayered packaging materials of the first and the second embodiments in the forms of lids, pauches, trays and the like can be subjected to known hot-water heat treatment such as retort sterilization or boil sterilization. For retort sterilization, various processes are available, such as recovery process, substitution process, vapor process, showering process and spraying process.

The packaging materials of the present invention tend to become whitish and opaque immediately after retort sterilization. For example, a lid or a pouch utilizing the packaging film of the first or second embodiment becomes, when retorted at 120° C. for 30 minutes, whitish and opaque just after the retorting. However, the thus whitened container will become transparent in an hour if it is dewatered in a centrifuge and then dried in a drier to remove water adhering to its surface in the same manner as for conventional containers for retorting, and the OTR will also reach the equilibrium value in 12 hours. In order to make transparent and restore the OTR value more surely, an accelerated drying condition is employed. For this purpose, a dry heating (generally in the air) is preferred, and preferred drying conditions are those that satisfy the following formula:

$$-\tfrac{1}{2}x+43 \leq y \leq -x+115$$

wherein x represents drying temperature (°C.) and is selected from a range of 30 to 100° C., and y represents drying time (min) and is selected from a range 0.5 to 85 min. An example of the drying conditions is 25 to 65 minutes, preferably 30 to 60 minutes, at 50° C.; or 5 to 35 minutes, preferably 5 to 30 minutes at 80° C. Within limits not to impair the purpose of the present invention, further longer drying time may be adopted.

Where even such temporary opaqueness is not desired for the packaging material of the second embodiment, it can be eliminated by having the moisture permeability of the outer layer be 40 to 100 g/m$^2$·day and that of the inner layer be not more than 10 g/m$^2$·day. To this end suited is a construction comprising example, polyethylene terephthalate (about 12 $\mu$) or polycarbonate (15 to 30 $\mu$) for the outer layer, and polypropylene (at least 50 $\mu$) for the inner layer. Then, a packaging film of this construction does not become whitened and opaque under normal retorting conditions (120° C., 30 minutes). However, the OTR of the film of this construction tends to restore slower than in the aforementioned case where a nylon film is used for the outer layer. To accelerate restoration, a more strengthened drying condition, for example for 60 minutes at 80° C., is preferred.

The multilayered packaging material of the present invention is useful principally for transparent packaging films, and, when in particular used as a lid or a pouch for retorting, shows an excellent transparency as well as a high oxygen gas barrier property which is unparalleled by conventional packaging materials for retorting. That is, while conventional PVDC packaging films have OTR's of 1.3 cc/m$^2$·day·atm which can give a storing capability of 4 months at longest, the transparent packaging films of the present invention readily give OTR's of from 0.2 to 0.8 cc/m$^2$·day·atm which are required for storing capability of longer than one year, the influence of which fact on retort packaging fields for food and medical care is unfathomable.

The art of the present invention can also apply to transparent, semitransparent or untransparent retortable containers of cup-shape or tray-shape. In such fields there has been used EVOH, the gas barrier property of which, however, is known to decrease by action of moisture invading thereinto upon retorting. To prevent the decrease, use of drying agents has been proposed. However, application of the multilayered packaging material of the present invention exhibit the high gas barrier property inherent to EVOH, without using any drying agent.

The above-described multilayered packaging materials of the present invention are used for food packaging as follows: It is filled with a food, and, as required, the inside is deaerated or the air inside is replaced by an inert gas such as nitrogen or carbon dioxide by a known method. Then the package is tight-sealed by heatsealing or the like, and then subjected to sterilization by boiling or retorting.

Foods to be packed in the multilayered packaging materials of the inventions are those already cooked, which are taken as they are, or those half-cooked, which are warmed up before being taken. Examples of such foods are as follows: cooked curry, cooked hash, stewed beef, borsch, meat sauce, braised pork with sweet vinegared sauce, sukiyaki, saute and chops-suey, boiled meat and potato, Japanese hotchpotch, asparagus boiled, sweet corn, mushroom, tuna cream-boiled, soups such as consomme, potage, miso-soup, pork and vegetable soup and "Kenchin" soup, boiled rice, rice and red beans boiled, boiled-in-iron-pot rice with subsidiaries ("Kamameshi"), roast rice, pilaf, rice-gruel, spaghetti, cooked buckwheat vermicelli, Japanese noodle, Chinese noodle, noodle, seasonings such as ones for Kamameshi and for Chinese noodles, boiled red beans, thick bean-meal soup with sugar and rice cake ("Zenzai"), boiled peas with honey and bean-jam ("Anmitsu"), quenelles, hamburgers, beef steaks, roast porks, pork soute, corned beef, ham, sausage, grilled fishes, roast meat, roast fowls, roast chicken, smoked fishes, bacon, boiled fish paste, pudding, jelly, sweet jelly of beans ("Yokan") and various pet foods.

The multilayered containers of the present invention are also superior for containers for fruits such as oranges, peaches, pineapples, cherries and olives; condiments such as soybean sauce, sauce, vinegar, sweet sake, dressings, mayonnaise, catsups, edible oil, miso and lard; bean curd; jam; butter; margarine; fruit juices; vegetable juices; beer; cola; lemonade; sake; distilled spirits; fruit wines; wines; whisky and brandy. Further, the packaging materials of the present invention can be used for containing medicines such as Ringer's solution, agricultural chemicals, cosmetics, washing agents or organic liquid chemicals, e.g. benzene, toluene, xylene, acetone, methylethyl ketone, normal hexane, kerosene, petroleum benzene, thinner, grease, etc.

Other features of the invention will become apparent in the course of the following descriptions of exemplary embodiments which are given for illustration of the invention and are not intended to be limiting thereof. Hereinbelow the first embodiment is supported by Examples 1-a through 18-a, and the second embodiment by Examples 1 through 12.

EXAMPLES

Example 1 and Comparative Examples 1 and 2

80 parts of pellets of a resin having an ethylene content of 28 mol %, a saponification degree of 99.8% and a melt index (190° C., 2160g) of 1.2 g/10 min as EVOH and 20 parts of a PA-6/12 copolymer [weight ratio of caprolactam unit to lauryl lactam unit: 80/20, melting point: 196° C. and relative viscosity: 2.5] were dry blended and the blend was then melt-extruded through a same direction twin-screw extruder (die temperature: 230° C.) to give blend pellets. After being dried, the blend pellets thus obtained were extruded through an extruder equipped with a screw of full-flight type having a diameter of 40 mm and with a coat hanger die (temperature: 230° C.) of 500 mm wide into a transparent film of 50 μ thick consisting of the composition.

Next, dry lamination was conducted with the thus obtained film of the composition as an intermediate layer, a commercial biaxially oriented nylon-6 film {Embrem ON (trade mark)} made by Unitica Ltd.; thickness: 15 μ and moisture permeability: 260 g/m²·day) as an outer layer and a commercial unoriented polypropylene film {Tohcello CP (trade mark) made by Tokyo Cellophane Ltd.; thickness: 50 μ and moisture permeability: 7 g/m²·day} as an inner layer to obtain a transparent 3-layer film. Takelac A-385 (trade mark) (made by Takeda Chemical Industries) was used as the adhesive for the dry lamination with Takenate A-50 (trade mark) (made by Takeda Chemical Industries) as a curing agent. After the lamination, the film was kept standing for 3 days at 40° C.

The film as a lid material was thermally bonded using a heat sealer, with the unoriented polypropylene layer facing inward, onto a cup-shape container made of polypropylene and filled with water. The cup was then subjected to a retort treatment using a retorting device (RCS-40RTGN, a bench high temperature and high pressure cooking sterilizing tester made by Hisaka Works) at 120° C. for 30 minutes.

Just after the retort treatment, the film of the lid looked whitish. Then it was dried at 80° C. for 5 minutes, and it became transparent again and had a good appearance with no wavy pattern.

Starting after the drying, the outside and inside of the film utilized for the lid were conditioned to 65% RH and 100% RH respectively, at 20° C., and the film was measured for the oxygen gas transmission rate (OTR) using OXTRAN-10/50A (made by Mocon Co.).

The OTR was 1.1 cc/m²·day·atm just after the drying and then rapidly decreased to 0.3 cc/m²·day·atm 1.1 after 12 hours, which value proves a high oxygen gas barrier property. This oxygen gas barrier property value shows that the stopper material of the present invention exhibits by far superior performance as compared with the OTR of a lid material for retort container utilizing a polyvinylidene chloride resin with a thickness of 50 μ (Comparative Example 1) of 1.3 cc/m²·day·atm, or with the OTR of a lid material of a multilayered film utilizing 2 layers of a high-barrier type polyvinylidene chloride film {SARAN-UB (trade mark) made by Asahi Chemical Industry, thickness: 25 μ} (Comparative Example 2) of 0.8 cc/m²·day·atm after retorting. Further, the same cup as made in Example 1 was filled with cooked curry and the cup with the contents was subjected to retort sterilization in the same manner as in Example 1.

Examples 2 through 7

Example 1 was repeated with the exceptions of using a thicker biaxially oriented nylon film for the outer layer (Examples 2 and 3), using compositions shown in Examples 2 to 6 in Table 1 instead of the composition of EVOH and PA in Example 1, and using an unoriented nylon film (Example 4) and a polyethylene terephthalate film (Example 7) instead of the biaxially oriented nylon film used in Example 1, to obtain various laminates.

The laminates thus obtained were subjected to retort treatments. Results of measurement of their OTR's and evaluations of their appearances are summarized in Table 1. These Examples of the present invention all show good transparency and exhibit high oxygen gas barrier properties.

Comparative Examples 3 through 5

Example 1 was repeated except for using conventional EVOH films instead of the composition film of Example 1 to obtain laminated films, followed by retort treatments thereof. The results are shown as Comparative Examples 3 and 4 in Table 1. Though they showed OTR's of from 0.3 to 0.4 cc/m²·day·atm, proving their high gas barrier properties, they had no good appearance suited for commercial use, with wrinkles and wavy patterns over all the surfaces.

Example 1 was again repeated except that a biaxially oriented polypropylene film (moisture permeability: 7 g/m²·day; Comparative Example 5) was used for the outer layer, instead of the biaxially oriented nylon film, to obtain a laminate film, followed by retort treatment of the film.

Though the film was transparent, it showed a high OTR, and was hence not suited for barrier-lids.

TABLE 1

| | | \multicolumn{6}{c}{Lids for Retorting and Their Evaluation (Retorting Condition: 120° C. 30 min.)} | | | |
|---|---|---|---|---|---|---|---|---|---|---|
| | Intermediate Layer (thickness in μ) | Composition of Intermediate Layer | | | Outer Layer*4 (μ) | Moisture Permeability*5 | Inner Layer*4 (μ) | Moisture Permeability*5 | OTR*6 | Appearance during storage |
| | | EVOH*1 | PA*2 | EVOH/PA Ratio*3 | | | | | | |
| Example 1 | Composition (50) | A | D | (80/20) | ON (15) | [260] | CPP (50) | [7] | 0.3 | good |
| Example 2 | Composition (50) | B | D | (90/10) | ON (25) | [156] | CPP (50) | [7] | 0.2 | good |
| Example 3 | Composition (50) | A | E | (80/20) | ON (37) | [105] | CPP (50) | [7] | 0.4 | good |
| Example 4 | Composition (50) | A | E | (80/20) | ON (30) | [300] | CPP (50) | [7] | 0.4 | good |
| Example 5 | Composition (50) | B | D | (65/35) | ON (15) | [260] | CPP (50) | [7] | 0.7 | good |
| Example 6 | Composition (50) | C | D | (70/30) | ON (15) | [260] | CPP (50) | [7] | 0.5 | good |
| Example 7 | Composition (50) | A | D | (80/20) | PET (12) | [50] | CPP (50) | [7] | 1.0 | good |
| Comp. Ex. 1 | PVDC (50) | — | — | — | ON (15) | [260] | CPP (50) | [7] | 1.3 | haze |
| Comp. Ex. 2 | SARAN-UB (50) | — | — | — | ON (15) | [260] | CPP (50) | [7] | 0.8 | whitened |
| Comp. Ex. 3 | EVOH (50) | A | — | — | ON (15) | [260] | CPP (50) | [7] | 0.4 | wrinkle, wavy pattern |
| Comp. | EVOH (50) | B | — | — | ON (15) | [260] | CPP (50) | [7] | 0.3 | wrinkle, wavy |

TABLE 1-continued

| | Intermediate Layer (thickness in μ) | Lids for Retorting and Their Evaluation (Retorting Condition: 120° C. 30 min.) | | | | | | | |
|---|---|---|---|---|---|---|---|---|---|
| | | Composition of Intermediate Layer | | | Outer Layer*4 (μ) | Moisture Permeability*5 | Inner Layer*4 (μ) | Moisture Permeability*5 | OTR*6 | Appearance during storage |
| | | EVOH*1 | PA*2 | EVOH/PA Ratio*3 | | | | | | |
| Ex. 4 Comp. Ex. 5 | Composition (50) | A | D | (80/20) | OPP (20) | [7] | CPP (50) | [7] | 40 | pattern transparent |
| Comp. Ex. 6 | Composition (50) | A | D | (50/50) | ON (15) | [260] | CPP (50) | [7] | 1.5 | whitened a little |

*1 A: ethylene content: 28 mol %, melt index: 1.2 g/10 min
B: ethylene content: 33 mol %, melt index: 1.3 g/10 min
C: ethylene content: 38 mol %, melt index: 1.3 g/10 min
*2 D: PA-6/12, content of PA-12 unit: 20 wt %, relative viscosity: 2.5
E: PA-6/12, content of PA-6 unit: 46 wt %, relative viscosity: 2.6
*3 weight ratio
*4 ON: biaxially drawn nylon film, PET: biaxially drawn polyethylene terephthalate film, CN: undrawn nylon film
OPP: biaxially drawn polypropylene film, CPP: undrawn polypropylene film
*5 g/m2·day (40° C., 90% RH)
*6 cc · 20 μ/m2 · day · atm (after 12 hours)

Example 8

The same multilayered films as used in Examples 1 through 7 were heatsealed into pouch-shape, which were then filled with water and heatsealed at the mouths. The pauches were retorted in the same retorting oven as in Example 1 at 120° C. for 30 minutes. After the retorting, the surfaces of the pauches were whitish.

The pauches were then kept standing in a hot-air circulating oven at 80° C. for 15 minutes. They became completely transparent and had good appearances with no wavy patterns or the like.

Example 9

Example 1 was repeated except for using for the outer layer a polycarbonate film (Panlite Film (trade mark), made by Teijin Ltd.; thickness: 20 μ and moisture permeability: 195 g/m2·day) instead of nylon film to obtain a 3-layer film. The thus obtained film was utilized as a stopper, and the stopper was retorted, in the same manner as in Example 1. The film after the retorting had a good appearance and showed an OTR after 12 hours of 0.7 cc/m2 ·day·atm, proving its high gas property. Example 10

Dry lamination was conducted in the same manner as in Example 1 with the composition film used in Example 1 as the intermediate layer, a commercial unoriented nylon film (thickness: 450 μ, moisture permeability: 300 g/m2·day) for the outer layer and a polypropylene sheet (thickness: 450 μ, moisture permeability: 0.78 g/m2·day) for the inner layer, to obtain a 3-layer laminated sheet. The laminate sheet thus obtained was formed into a square tray-shape container of 140 mm long, 83 mm wide and 19 mm high using a vacuum air-pressure thermoforming machine (made by Asano Laboratories). The thickness construction of the container was, from outside, nylon (20 μ, moisture permeability: 480 g/m2·day), the composition (33 μ) and polypropylene (296 μ, moisture permeability:1.2 g/m2·day). After re-placement of the inside air by nitrogen, the tray was filled with 5 ml of water and heatsealed with the lid obtained in Example 1. Thereafter, the tray was re-torted at 120° C for 30 minutes.

The tray was then taken out of the retorting oven and dried at 80° C. for 15 minutes, followed by storage for 6 months at 20° C., 65% RH. The oxygen gas concentration in the container measured after the storage was 0.4%, a value sufficiently low to protect various foods from degradation due to oxygen.

Example 11

A co-extruded multilayered film consisting of 4 layers was prepared using a co-extrusion equipment of feed block type equipped with 4 extruders and a T die. The film construction was, from outside, polyamide-6 {Novamid 1020 (trade mark) made by Mitsubishi Chemical Industries; thickness: 20 μ}, the blend composition used in Example 1 (thickness: 50 μ), adhesive resin {Modic P-300F (trade mark) made by Mitsubishi Petrochemical Co., thickness 20 μ} and polypropylene {Noblen MA-6 (trade mark) made by Mitsubishi Petrochemical Co., thickness: 60 μ}. The moisture permeability of the outer layer, as estimated from that of a single-layer film having the same thickness, is 450 g/m2·day. The moisture permeability of the inner layer as estimated from that measured on a 2-layer film consisting of polypropylene (60 μ) and the adhesive resin (20 μ) is 4.6 g/m2·day. The multilayered film was utilized as a lid in the same manner as in Example 1 and the lid was retorted at 120° C. for 30 minutes, followed by hot-air drying at 80° C. for 5 minutes. The lid film was good in transparency and had no wavy pattern. The OTR's measured 5 hours and 1 day after the retorting were 0.9 cc/m2 ·day atm and 0.4 cc/m2·day·atm respectively.

Example 12

A 4-layer co-extruded multilayered sheet was prepared using the same co-extrusion equipment equipped with 4 extruders and a T die as in Example 11. The sheet construction was, from outside, polyamide-6 {Novamid 1020 (trade mark) made by Mitsubishi Chemical Industries, thickness: 54 μ}, the blend composition used in Example 1 (thickness: 135 μ), adhesive resin {Admer QF-500 (trade mark), thickness: 27 μ} and polypropylene {Mitsubishi Noblen X-1B (trade mark) made by Mitsubishi Petrochemical Co., thickness: 1350 82 }. The obtained sheet was formed into a cup-shape container with a round bottom having a radius of 33 mm and a circular top having a radius of 37 mm using a vacuum air-pressure thermo-forming machine (made by Asano Laboratories). The construction of the cup was, from outside, polyamide-6 (average thickness: 20 μ), the blend composition (50 μ), adhesive resin (10 μ) and polypropylene (500 μ). The moisture permeabilities of the outer and inner layers were 450 g/m2·day and 0.7 g/m2·day respectively. After replacement of inside air by nitrogen gas, the cup was filled with 5 ml of water and heatsealed with the lid shown in Example 1. Then the cup was retorted at 120° C. for 30 minutes, taken out from the retorting oven and hot-air dried at 80° C. for 15 minutes, followed by storage for 1 year at 20° C., 65% RH. The oxygen gas concentration after the storage was 0.35%, which is sufficiently low for protecting various foods from degradation by oxygen.

Example 1-a and Comparative Examples 1-a and 2-a 80 parts of pellets of a resin having an ethylene content of 28 mol %, a saponification degree of 99.8% and a melt index (190° C., 2160 g) of 1.2 g/10 min as EVOH and 20 parts of a PA-6/12 copolymer [weight ratio of caprolactam unit to lauryl lactam unit: 80/20, melting point: 196° C. and relative viscosity: 2.5] were dry blended and the blend was then melt-extruded through a same direction twin-screw extruder (die temperature: 230° C.) to give blend pellets. After being dried, the blend pellets thus obtained were extruded through an extruder equipped with a screw of full-flight type having a diameter of 40 mm and with a coat hanger die (temperature: 230° C.) of 500 mm wide into a transparent film of 50 $\mu$ thick consisting of the composition.

Next, dry lamination was conducted with the thus obtained film of the composition as an outer layer and a commercial unoriented polypropylene film (Tohcello CP (trade mark); thickness: 50 $\mu$ and moisture permeability: 7 g/m$^2$·day) as an inner layer to obtain a transparent 2-layer film. Takelac A-385 (trade mark) (made by Takeda Chemical Industries) was used as the adhesive for the dry lamination with Takenate A-50 (trade mark) (made by Takeda Chemical Industries) as a curing agent. After the lamination, the film was kept standing for 3 days at 40° C.

The film as a lid material was thermally bonded using a heat sealer, with the unoriented polypropylene layer facing inward, onto a cup-shape container made of polypropylene. The cup was then subjected to a retort treatment using a retorting device (RCS-40RTGN, a bench high temperature and high pressure cooking sterilizing tester made by Hisaka Works) at 120° C. for 30 minutes.

Just after the retort treatment, the film of the lid looked whitish. Then it was dried at 80° C. for 5 minutes, and it became transparent again and had a good appearance with no wavy pattern.

Starting just after the drying, the outside and the inside of the film utilized for the lid were conditioned to 65% RH and 100% RH, respectively, at 20° C., and the film was measured for the oxygen gas transmission rate (OTR) using OXTRAN-10/50A (made by Mocon Co.).

The OTR was 1.1 cc/m$^2$·day·atm just after the drying and then rapidly decreased to 0.3 cc/m$^2$·day·atm 1.1 after 4 hours, which value proves a high oxygen gas barrier property. This oxygen gas barrier property value shows that the lid material of the present invention exhibits by far superior performance as compared with the OTR of a lid material for retort container utilizing a polyvinylidene chloride resin with a thickness of 50 $\mu$ (Comparative Example 1-a) of 1.3 cc/m·day atm, or with the OTR of a lid material of a multilayered film utilizing 2 layers of a high-barrier type polyvinylidene chloride film (SARAN-UB (trade mark) made by Asahi Chemical Industry, thickness: 25 $\mu$) (Comparative Example 2-a) of 0.8 cc/m$^2$·day·atm after retorting. The same cup as made in Example 1-a was filled with cooked curry and rice and the cup with the contents was subjected to retort sterilization in the same manner as in Example 1-a.

Examples 2-a through 6-a

Example 1-a was repeated except for using the outer layer compositions shown in the columns for Examples 2-a to 6-a in Table 2, to obtain laminate films, followed by retort treatment thereof. The OTR's measured and evaluation results of the appearances of the films are shown in Table 2. The films of these Examples of the present inention all show high transparency and high oxygen gas barrier properties.

Comparative Example 3-a

Example 1-a was repeated except for using an EVOH film instead of the composition film for the outer layer to obtain a laminate film, followed by retort treatment thereof. Then, the surface of the film melted and the film was not in a state to be placed for practical use.

TABLE 2

Lids for Retorting and Their Evaluation

| | Outer Layer (thickness in $\mu$) | Composition of Outer Layer | | | Inner Layer*4 ($\mu$) | Moisture Permeability*5 | OTR*6 | Appearance during storage |
|---|---|---|---|---|---|---|---|---|
| | | EVOH*1 | Resin*2 | Ratio of EVOH/Resin*3 | | | | |
| Example 1-a | Composition (50) | A | D | (80/20) | CPP(50) | [7] | 0.3 | good |
| Example 2-a | Composition (50) | B | D | (90/10) | CPP(50) | [7] | 0.2 | good |
| Example 3-a | Composition (50) | A | E | (80/20) | CPP(50) | [7] | 0.4 | good |
| Example 4-a | Composition (50) | C | D | (60/40) | CPP(50) | [7] | 0.5 | good |
| Example 5-a | Composition (50) | B | E | (70/30) | CPP(50) | [7] | 0.4 | good |
| Example 6-a | Composition (50) | B | F | (80/20) | CPP(50) | [7] | 0.2 | good(half-opaque) |
| Comp. Ex. 1-a | PVDC (50) | — | — | — | CPP(50) | [7] | 1.3 | haze |
| Comp. Ex. 2-a | SARAN-UB (50) | — | — | — | CPP(50) | [7] | 0.8 | whitened |
| Comp. Ex. 3-a | EVOH (50) | A | — | — | CPP(50) | [7] | — | outer layer melted |

*1 A: ethylene content: 28 mol %, melt index: 1.2 g/10 min
B: ethylene content: 33 mol %, melt index: 1.3 g/10 min
C: ethylene content: 38 mol %, melt index: 1.3 g/10 min
*2 D: PA-6/12, content of PA-12 unit: 20 wt %, relative viscosity: 2.5
E: PA-6/12, content of PA-6 unit: 46 wt %, relative viscosity: 2.6
F: polypropylene modified with maleic anhydride, melt flow index (230° C.): 4.2 g/10 min
*3 weight ratio
*4 CPP: undrawn polypropylene film
*5 g/m$^2$ · day (40° C., 90% RH)
*6 cc · 20 $\mu$/m$^2$ · day · atm (after 4 hours)

Example 7-a

The same multilayered films as used in Examples 1-a through 6-a were heatsealed into pouch-shape, which were then filled with water and heatsealed at the mouths. The pauches were retorted in the same retorting oven as in Example 1-a at 120° C. for 30 minutes. After the retorting, the surfaces of the pauches were whitish.

The pauches were then kept standing in a hot-air circulating oven at 80° C. for 10 minutes. They became completely transparent and had good appearances with no wavy patterns or the like.

Example 8-a

Dry lamination was conducted in the same manner as in Example 1-a with the composition film used in Example 1-a as the outer layer and a polypropylene sheet (thickness: 450 $\mu$, moisture permeability: 0.78 g/m$^2$·day) for the inner layer, to obtain a 2-layer laminated sheet. The laminate sheet thus obtained was formed into a square tray-shape container of 140 mm long, 83 mm wide and 19 mm high using a vacuum air-pressure thermoforming machine (made by Asano Laboratories). The thickness construction of the container was, from outside, the composition (33 $\mu$) and polypropylene (296 $\mu$, moisture permeability: 1.2 g/m$^2$·day). After replacement of the inside air by nitrogen, the tray was filled with 5 ml of water and heatsealed with the lid obtained in Example 1-a. Thereafter, the tray was retorted at 120° C. for 30 minutes.

The tray was then taken out of the retorting oven and dried at 80° C. for 10 minutes, followed by storage for 6 months at 20° C., 65% RH. The oxygen gas concentration in the container measured after the storage was 0.37%, a value sufficiently low to protect various foods from degradation due to oxygen.

Example 9-a

A co-extruded multilayered film consisting of 3 layers was prepared using a co-extrusion equipment of feed block type equipped with 3 extruders and a T die. The film construction was, from outside, the blend composition used in Example 1-a (thickness: g50 $\mu$), adhesive resin (Modic P-300F (trade mark) made by Mitsubishi Petrochemical Co., thickness: 20 $\mu$) and polypropylene (Noblen MA-6 (trade mark) made by Mitsubishi Petrochemical Co., thickness: 60 $\mu$). The moisture permeability of the inner layer as estimated from that measured on a 2-layer film consisting of polypropylene (60 $\mu$) and the adhesive resin (20 $\mu$) is 4.6 g/m$^2$·day. The multilayered film was utilized as a lid in the same manner as in Example 1-a and the lid was retorted at 120° C. for 30 minutes, followed by hot-air drying at 80 ° C. for 5 minutes. The lid film was good in transparency and had no way pattern. The OTR's measured 5 hours after the retorting were 0.4 cc/m$^2$·day·atm.

Example 10-a

A 3-layer co-extruded multilayered sheet was prepared using the same co-extrusion equipment equipped with 3 extruders and a T die as in Example 9-a. The sheet construction was, from outside, the blend composition used in Example 1-a (thickness: 135 $\mu$), adhesive resin (Admer QF-500 (trade mark), thickness: 27 $\mu$) and polypropylene (Mitsubishi Noblen X-1B (trade mark) made by Mitsubishi Petrochemical Co., thickness: 1350 $\mu$). The obtained sheet was formed into a cup-shape container with a round bottom having a radius of 33 mm and a circular top having a radius of 37 mm using a vacuum air-pressure thermoforming machine (made by Asano Laboratories). The construction of the cup was, from outside, the blend composition (50 $\mu$), adhesive resin (10 $\mu$) and polypropylene (500 $\mu$). The moisture permeabilities of the inner layer was 0.7 g/m$^2$·day. After replacement of inside air by nitrogen gas, the cup was filled with 5 ml of water and heatsealed with the lid shown in Example 1-a. Then the cup was retorted at 120° C. for 30 minutes, taken out from the retorting oven and hot-air dried at 80° C. for 15 minutes, followed by storage for 1 year at 20° C., 65% RH. The oxygen gas concentration after the storage was 0.32%, which value corresponds to a weight of oxygen gas permeated of 1.19 cc-STP, which in turn corresponds to an amount of oxygen absorbed by an aqueous food when the food is filled in the container. The concentration is sufficiently low for protecting various foods from degradation by oxygen.

Examples 11-a through 16-a

A kneaded blend composition (Composition-a) was prepared from 70 parts of the same blend composition as used in Example 1-a and 30 parts of mica (mascobite mica, flake diameter: 30 $\mu$, aspect ratio: 30) using a same direction twin-screw extruder-kneader. This operation was repeated using sericite (flake diameter: 13 $\mu$, aspect ratio: 20), talc (flake diameter: 10 $\mu$, aspect ratio: 9) and glass flake (flake diameter: 50 $\mu$, aspect ratio: 25) to obtain Compositions-b, -c and -d, respectively.

Separately, two pelletized blends were prepared; i.e. Composition-e from 85 parts of a resin pellet, as EVOH, having an ethylene content of 33 mol %, a saponification degree of 99.8% and a melt index (190° C., 2160g) of 1.3 g/10 min and 15 parts of a polyethylene terephthalate/isophthalate having an isophthalic acid component in the acid component of 6 mol % and an intrinsic viscosity of 0.84 dl/g), (flake diameter: 10 $\mu$), and Composition-f from 85 parts of the above EVOH and 15 parts of a polycarbonate (Upiron E-2000 (trade mark) made by Mitsubishi Gas Chemical).

Then cup-shaped containers were prepared in the same manner as in Example 10-a except that the above 6 compositions (Composition-a through Composition-f) were employed instead of the blend composition used in Example 10-a. The cups were retorted, then stored for 1 year, and thereafter measured for the oxygen concentrations therein (Examples 11-a through 16-a). The concentration values measured were, in alphabetical sequence, 0.25%, 0.29%, 0.30%, 0.26%, 0.33% and 0.35%. All of the values are sufficiently low to protect various foods from degradation caused by oxygen.

Example 17-a

The same multilayered film as used in Example 1-a was, with an unoriented polypropylene layer as the inner layer, heatsealed into a square pouch of 10 cm × 10 cm. The pouch was filled with 40 g of stewed beef, then, after deaeration of the inside, the pouch was tight sealed by heatsealing. The food package thus obtained was retorted in a retorting oven at 120° C. for 15 minutes. The package was then taken out of the retorting oven, removed of water adhered in a centrifuge, and dried in a drier at 80° C. for 18 minutes. The food package was of sufficient transparency to see the content through the film. The contents showed, after storage for 6 months at a room temperature, no change in color shade and taste.

Example 18-a

Dry lamination similar to that in Example 1-a was conducted to obtain a transparent 3-layer film having an outer layer of the composition used in Example 1-a, an intermediate layer of a commercial PVDC film (Kflex (trade mark) made by Kureha Chemical Industries; thickness: 15 $\mu$) and an inner layer of a commercial unoriented polypropylene film (Tohcello CP (trade mark), thickness: 50 $\mu$). The thus obtained film was superior, particularly in food keeping property when used as retortable pauches or lids.

What is claimed is:

1. A gas-barrier multilayered packaging material, comprising:
   a barrier layer adapted to contact a moist environment during retort or boil sterilization procedures, comprising 55–97% by weight of an ethylene vinyl alcohol polymer having an ethylene content of 20–50 mol % and 45 to 3% by weight of a resin selected from the group consisting of polyamide resin, polyolefin resin, polyester resin and polycarbonate resin; and
   a layer of a hydrophobic thermoplastic resin having a low moisture permeability in contact therewith.

2. A gas-barrier multilayered packaging material according to claim 1, wherein said barrier layer is the outer layer and said thermoplastic resin is the inner layer of said multilayered packaging material and said barrier layer is adapted for direct contact with said moist environment.

3. A multilayered packaging material as defined in claim 2, wherein said moisture permeability (measured at 40° C., 90% RH) of the inner layer is not higher than 20 g/m$^2$·day.

4. A multilayered packaging material as defined in claim 2, wherein said composition of the outer layer comprises the ethylene-vinyl alcohol copolymer and a polyamide resin.

5. A multilayered packaging material as defined in claim 4, wherein said polyamide resin is caprolactam-lauryl lactam copolymer.

6. A multilayered packaging material as defined in claim 2, wherein said hydrophobic thermoplastic resin having a low moisture permeability is polypropylene resin.

7. A multilayered packaging film for boil sterilization or retort sterilization comprising the multilayered packaging material according to claim 2.

8. A lid for containers for boil sterilization or retort sterilization comprising the multilayered packaging material according to claim 2.

9. A pouch for boil sterilization or retort sterilization comprising the multilayered packaging material according to claim 2.

10. A cup-shape or tray-shape container for boil sterilization or retort sterilization comprising the multilayered packaging material according to claim 2.

11. A gas-barrier multilayered packaging material according to claim 1, further comprising a moisture permeable resin layer having a moisture permeability (measured at 40° C., 90% RH) of at least 40 g/m$^2$·day, wherein said moisture permeable layer is the outermost layer of said multilayered packaging material, said thermoplastic resin is the innermost layer, and said gas barrier layer is an intermediate layer interposed between said moisture permeable layer and said thermoplastic resin.

12. A multilayered packaging material as defined in claim 11, wherein said moisture permeability of the inner layer is not higher than 20 g/m$^2$·day.

13. A multilayered packaging material as defined in claim 11, wherein said resin utilized for the outer layer comprises as a principal component at least one member selected from the group consisting of polyamide, polyester and polycarbonate.

14. A multilayered packaging material as defined in claim 11, wherein said resin utilized for the outer layer comprises as a principal component at least one member selected from the group consisting of polycapramide and poly(hexamethylene diammonium adipate) and caprolactam/hexamethylene diammonium adipate) copolymer.

15. A multilayered packaging material as defined in claim 11, wherein said composition of the intermediate layer comprises the an ethylene-vinyl alcohol copolymer and a polyamide.

16. A multilayered packaging material as defined in claim 15, wherein said polyamide resin is caprolactam-lauryl lactam copolymer.

17. A multilayered packaging material as defined in claim 11, wherein said resin utilized for the inner layer is polypropylene resin.

18. A multilayered packaging film for boil sterilization or retort sterilization comprising the multilayered packaging material according to claim 11.

19. A lid for containers for boil sterilization or retort sterilization comprising the multilayered packaging material according to claim 11.

20. A pouch for boil sterilization or retort sterilization comprising the multilayered packaging material according to claim 11.

21. A cup-shape or tray-shape container for boil sterilization or retort sterilization comprising the multilayered packaging material according to claim 11.

* * * * *